Nov. 28, 1967 N. W. MAPHAM 3,355,600
TRIGGERING MEANS FOR CONTROLLED RECTIFIERS
Filed March 16, 1965 3 Sheets-Sheet 1
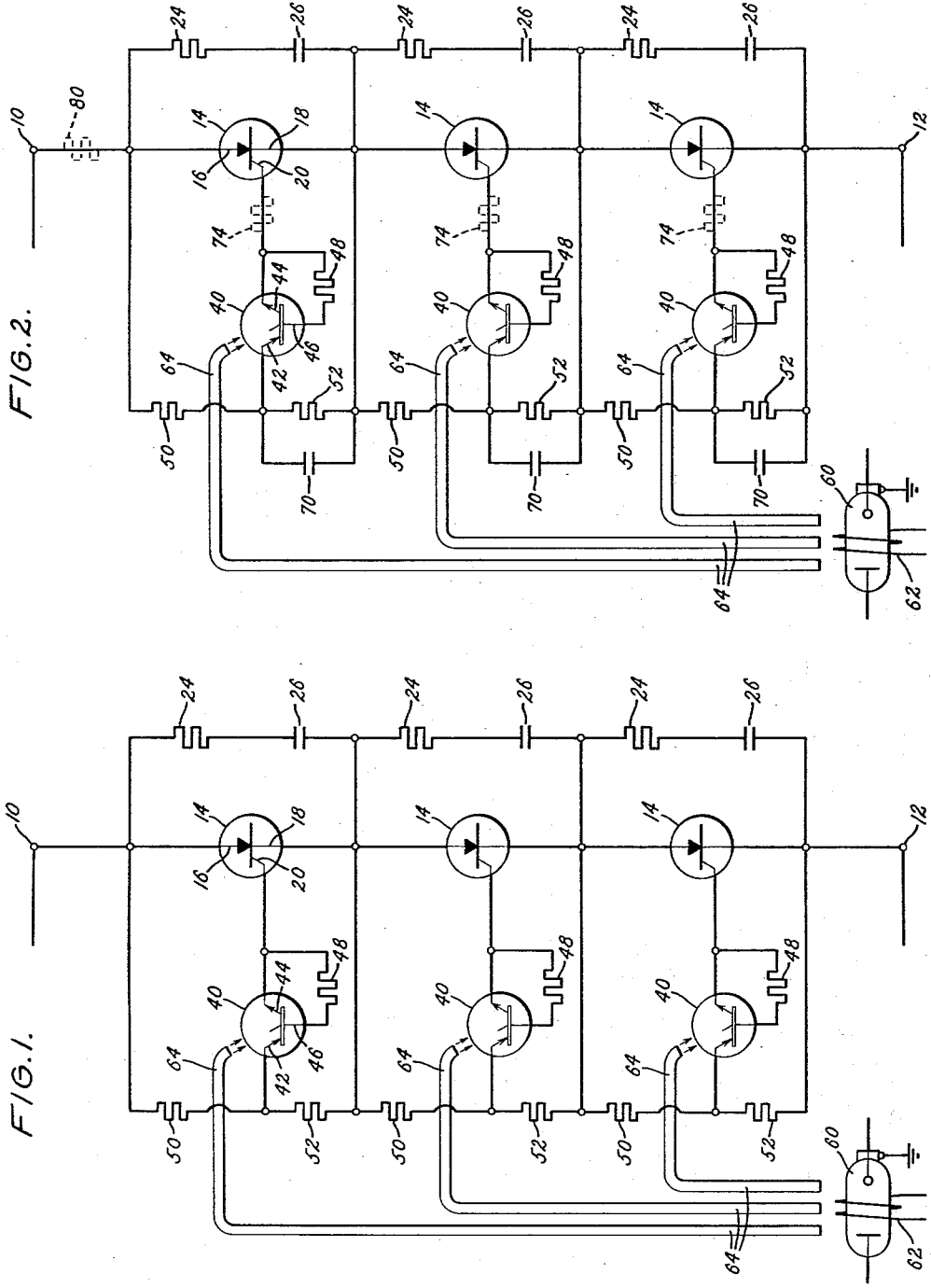
INVENTOR:
NEVILLE W. MAPHAM,
BY William Freedman
ATTORNEY

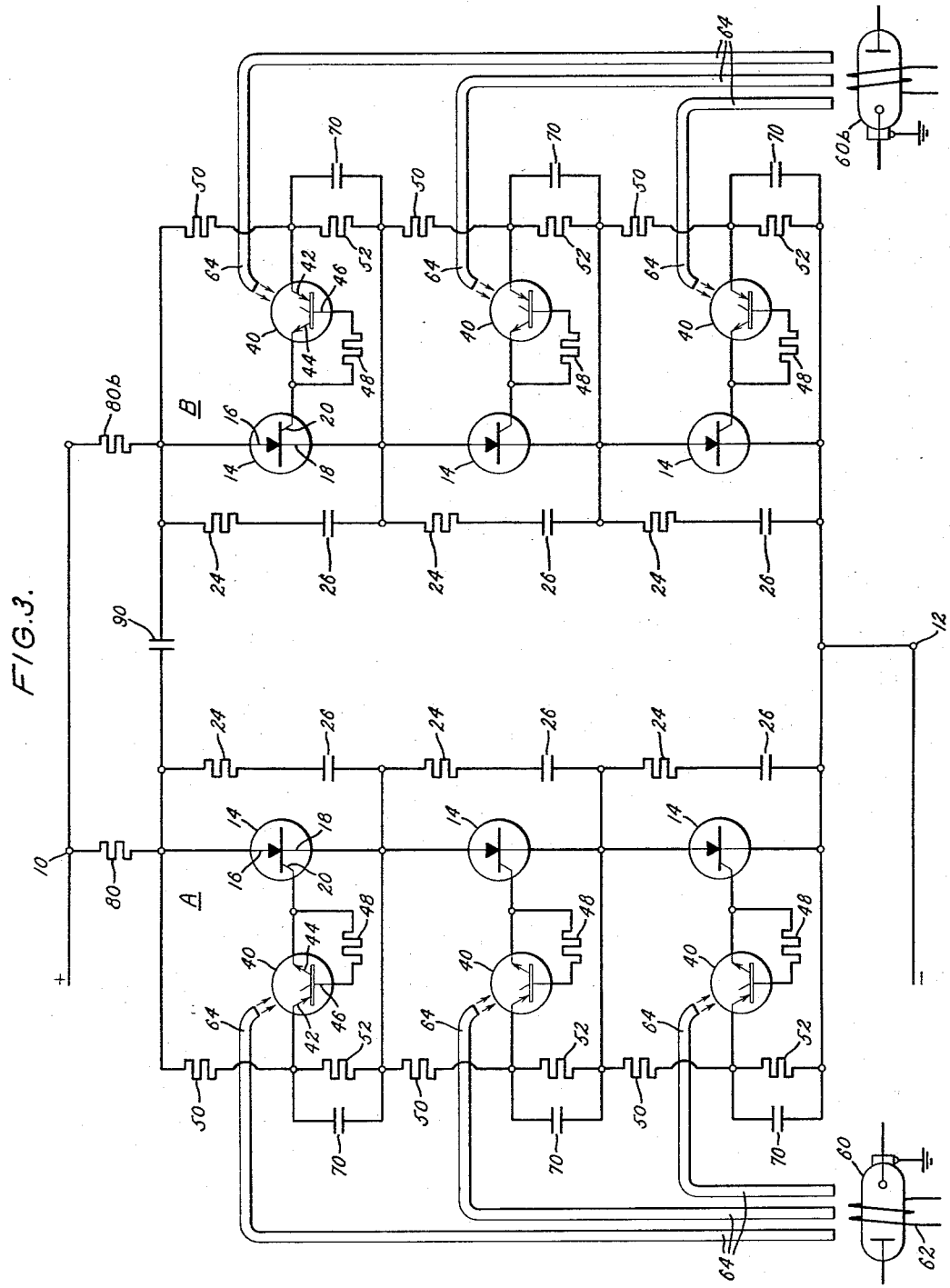

United States Patent Office 3,355,600
Patented Nov. 28, 1967

3,355,600
TRIGGERING MEANS FOR CONTROLLED
RECTIFIERS
Neville W. Mapham, Jordan, N.Y., assignor to General
Electric Company, a corporation of New York
Filed Mar. 16, 1965, Ser. No. 440,261
11 Claims. (Cl. 307—88.5)

ABSTRACT OF THE DISCLOSURE

Trigger signals for a high-voltage string of controlled rectifiers are simultaneously generated on command from a physically and electrically remote point of control by providing in the vicinity of the controlled rectifiers a plurality of means for converting light signals to appropriate trigger signals and by supplying said light signals to the respective converting means from a remotely located common source of light.

---

This invention relates to triggering means for controlled rectifiers and, more particularly, to triggering means for effecting substantially simultaneous turn-on of a plurality of controlled rectifiers connected in series. In its broader aspects, the invention also has application to the simultaneous triggering of parallel-connected controlled rectifiers.

When controlled rectifiers are applied to circuits having maximum operating voltages higher than the voltage rating of a single controlled rectifier, it is customary to connect a plurality of the controlled rectifiers in series so that the total operating voltage is shared by the controlled rectifiers. For distributing the total voltage so that the voltage across each rectifier is less than its rated voltage, it is customary to connect across each rectifier a voltage-controlling element such as a capacitor, or a resistor, or an appropriate combination of a capacitor and resistor. If suitably selected, such voltage-controlling elements can perform their intended voltage-limiting function in an entirely satisfactory manner during the period before the rectifiers are triggered into conduction, or fired.

But if one of the controlled rectifiers is fired before the others, then the voltage across the unfired rectifiers may rise to objectionably high levels despite the presence of the voltage-controlling elements connected thereacross. This is the case because the voltage across the fired rectifier quickly collapses, and the remaining voltage is applied to the unfired rectifiers.

This voltage condition can be prevented if the rectifiers are fired substantially simultaneously, but such simultaneous firing has heretofore been very difficult to achieve. In this regard, firing of the controlled rectifiers is effected by applying a gating current to the usual gate of the controlled rectifier. It is known that by using gating current with a steep rise-time, the effect of variations in the gate characteristics can be lessened, thus facilitating simultaneous firing. But it has been difficult and expensive to develop gating currents with a steep risetime in a plurality of gate circuits, particularly gate circuits that are at widely different voltage levels. The usual approach is to use a transformer with a plurality of secondary windings for the respective gate circuits. Not only is such a transformer expensive for high voltage applications, but it has leakage inductance and distributed capacitance which interfere with developing current pulses of the desired steepness in all the secondary windings and their corresponding gate circuits. This is particularly so when there are many gate circuits, as would be the case with a high voltage application having many controlled rectifiers in series.

Accordingly, an object of my invention is to provide simple and improved triggering means for simultaneously firing a plurality of series-connected controlled rectifiers.

Another object is simultaneously to apply a steep risetime gating signal to a plurality of gate circuits for controlled rectifiers connected in circuit with each other.

In carrying out my invention in one form, I provide a plurality of series-connected main controlled rectifiers each having an anode, a cathode, and a gate. For substantially simultaneously turning on (firing) the main controlled rectifiers, I provide triggering means comprising a plurality of light-activated controlled rectifiers that control the application of gating current signal impulses to the respective gates of said main controlled rectifiers. Each of the light-activated controlled rectifiers comprises an anode and a cathode and means for initiating conduction therebetween in response to the reception of a predetermined light signal, and such conduction causes the triggering means to produce gating current signal impulses. The triggering means further comprises means including a light source common to all of said light-activated controlled rectifiers for developing and transmitting light energy that simultaneously reaches all of said light-activated controlled rectifiers in the form of light signals of sufficient irradiance to initiate conduction between the anode and cathode of each light-activated controlled rectifier.

For a better understanding of the invention, reference may be had to the following description taken in connection with the accompanying drawings, wherein:

FIG. 1 is a schematic illustration of a controlled rectifier circuit embodying one form of the invention.

FIG. 2 is a schematic illustration of a modified form of the invention.

FIG. 3 illustrates an application of the invention to an inverter.

Figure 4:
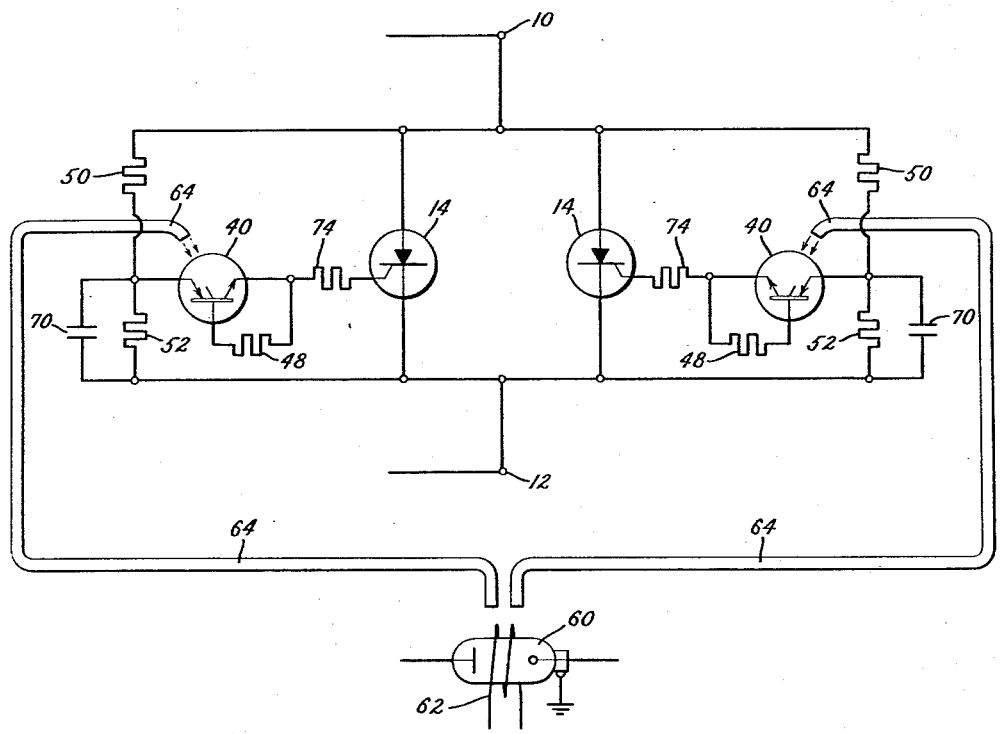
FIG. 4 is a schematic illustration of still another modified embodiment of the invention.

Referring now to FIG. 1, I have shown a pair of opposed terminals 10 and 12, which are adapted to be connected to a suitable source of voltage. This source of voltage may be either alternating or unidirectional.

Connected in series relationship across the terminals 10 and 12 are a plurality of silicon controlled rectifiers, each being schematically indicated at 14. Each controlled rectifier 14 comprises an anode 16, a cathode 18, and a gate 20. The structure and operating characteristics of the silicon controlled rectifier are now well known in the art, as will be apparent, for example, from the Silicon Controlled Rectifier Manual, Third Edition, published in 1964 by the General Electric Company. But the following brief comments may facilitate an understanding of the invention.

The controlled rectifier is a three junction semi-conductor device whose reverse characteristic is similar to that of a normal semiconductor rectifier in that it represents essentially an open circuit with negative anode-to-cathode voltage. The forward characteristic is such that it will block positive anode-to-cathode voltages below a critical breakover voltage if no signal is applied to the gate terminal. However, if the forward breakover voltage is exceeded or if an appropriate gate signal is applied, the device will rapidly switch to a conducting state and present the characteristically low forward voltage drop of a single junction semiconductor rectifier. The controlled rectifier's behavior is similar in some respects to that of a mercury vapor thyratron. Like the thyratron, once the controlled rectifier has been fired by its control or gate element, it can only be turned off by removal or reversal of its anode voltage. Thyratrons, however, are fired by a potential on the grid of the tube, whereas the controlled rectifier is fired by current flowing through its gate element.

The controlled rectifier consists basically of a four layer pnpn device with its gate being connected through an ohmic connection to the inner p region of the unit. The anode terminal is connected to the outer p region and the cathode terminal to the outer n region. The controlled rectifier blocks current in either direction until a critical forward breakover voltage is exceeded. At this voltage the center pn junction begins to avalanche. Current through the device increases rapidly until the current gain exceeds unity. This current level is relatively low. When reached and exceeded, it effectively reverses the bias of the center pn junction. Voltage across the device then becomes low and the current is limited essentially only by the external series load impedance. The application of a gating current signal to the ohmic connection switches the controlled rectifier from the nonconducting state to a conducting state without the necessity of exceeding the critical breakover voltage. The device can be fired by gate current pulses of extremely short duration.

Controlled rectifiers may be damaged if subjected to voltages, either forward or reverse, in excess of their rated value. Accordingly, when controlled rectifiers are applied to circuits having maximum operating voltages that are higher than the voltage rating of a single controlled rectifier, it is customary to connect a plurality of the controlled rectifiers in series so that the total operating voltage is shared by the controlled rectifiers. In FIG. 1, I have shown three controlled rectifiers 14 connected in series, but it is to be understood that fewer or more may be used, depending upon the maximum circuit voltage.

For dividing the total voltage so that the voltage across each controlled rectifier is less than its rated voltage, the series combination of a resistor 24 and a capacitor 26 is connected across each controlled rectifier, and in parallel with each series combination of resistor 24 and capacitor 26, there is connected a shunt resistance means comprising the series combination of two resistors 50 and 52. Thus there is a serial string of shunt resistances 50, 52 connected between the source terminals 10 and 12. Assuming that each of the three controlled rectifiers 14 has the same voltage rating, then the three shunt resistances 50, 52 are matched to divide the pre-starting voltage between terminals 10 and 12 substantially equally among the controlled rectifiers. The capacitors 26 are also preferably of substantially equal values. As is known, the capacitors 26 help to equalize the voltages across the controlled rectifiers 14 when they are recovering to their reverse blocking state after a conducting period. The capacitors 26 can also provide for some voltage sharing in the event that the controlled rectifiers are not fired precisely simultaneously during the turn-on period. The capacitors 26 also assist in distributing relatively high frequency voltage components between the rectifiers 14 during the period before turn-on. Resistors 24 are damping resistors provided primarily for the purpose of preventing oscillations in the capacitor circuits in case of an inductive load circuit, or inductance associated with the source, or inductance in the loop comprising capacitor 26, resistor 24, and controlled rectifier 14. For very steep transients, these damping resistors constitute the main part of the impedance of the capacitor-damping resistor combination; and for this reason and others, it is desirable that these three resistors should be of substantially the same value.

Voltage-controlling elements such as 24, 26, and 50, 52 can satisfactorily limit the voltage across each controlled rectifier to a value below its rating during the period before firing occurs and also during the recovery period following conduction. But they may not so limit the voltage when firing occurs unless the controlled rectifiers are fired substantially simultaneously. As pointed out hereinabove, if one rectifier is fired before the others, the voltage thereacross quickly collapses, and the remaining voltage will be applied to the unfired rectifiers. If the portion of this remaining voltage applied to each unfired rectifier exceeds its voltage rating, the unfired rectifier may be damaged.

It is known that gating current signals with a steep rise-time applied to the controlled rectifiers aids in synchronizing the firing by lessening the effect of variation in gate characteristics. But it has been difficult to develop gating current signals with steep rise-time in a plurality of gate circuits, particularly gate circuits which are at widely different voltages. The usual approach has been to use a pulse transformer with a plurality of secondary windings for the respective gate circuits, but this is expensive and not entirely satisfactory for the reasons pointed out hereinabove.

As a solution to these problems, I have provided the triggering means illustrated in FIG. 1. This triggering means comprises a plurality of light-activated silicon controlled rectifiers 40. Each of the rectifiers 40 is electrically coupled to the gate 20 of at least one of the respective main rectifiers that are connected in series across the source terminals 10 and 12. Each of these light-activated controlled rectifiers 40 comprises an anode 42, a cathode 44, and a gate 46; the anode 42 and cathode 44 being connected in series with the gate 20 of the main controlled rectifier. Each light-activated rectifier further comprises a silicon pellet (not shown) to which the three leads of the rectifier are connected. The silicon pellet has a light sensitive area, and light signals may be transmitted into contact with this light sensitive area through a suitably located glass window in the surrounding envelope of the rectifier. The light-activated controlled rectifier is triggered into conduction when the effective irradiance of the light signal falling on the silicon pellet exceeds a given threshold level. The performance of the light-activated silicon controlled rectifier before and after its being triggered into conduction is substantially the same as that of a conventional silicon controlled rectifier. The basic difference is that the light-activated controlled rectifier can be triggered by a light signal. The light-activated controlled rectifier per se is not a part of my invention, and if a more complete description of its structure and operation is desired, reference may be had to pages 205–217 of the above-cited Silicon Controlled Rectifier Manual, third edition.

For determining and for stabilizing the light sensitivity of the light-activated controlled rectifier 40, a suitable external resistor 48 is connected between its gate 46 and cathode 44.

For reducing the anode-to-cathode voltage imposed upon the light activated silicon controlled rectifier, each shunting resistance 50, 52 is used as a voltage divider. Each of these voltage dividers comprises a pair of series-connected resistors 50 and 52 connected across each of the main controlled rectifiers, and the anode of the light-activated controlled rectifier 40 is connected to a point between the two resistors 50 and 52. The resistance of resistor 52 is preferably fairly small compared to that of resistor 50, so that only a small fraction of the relatively large voltage appearing across the main controlled rectifier 14 appears across the light-activated controlled rectifier. This permits the use of a light-activated controlled rectifier with a considerably lower voltage rating than that of main controlled rectifier.

When the light-activated controlled rectifier is fired by a light signal, a steep rise-time current pulse flows through its anode-circuit and through the gate-cathode circuit of the associated main controlled rectifier 14. This immediately fires the main controlled rectifier 14. The gating energy for the main controlled rectifier is derived from the voltage source to which the terminals 10 and 12 are connected and is stored in the capacitor 26, which rapidly discharges in response to firing of the light-activated controlled rectifier 40, sending current pulses through a circuit that extends from one capacitor terminal through resistors 24 and 50, the anode 42 and cathode 44 of the light-activated rectifier, and the gate 20 and cathode 16 of the main controlled rectifier to the other capacitor terminal.

For firing the light-activated controlled rectifiers 40 substantially simultaneously, I provide a normally-off light source 60 that is common to all of the light-activated controlled rectifiers 40. This light source may be of any suitable type which, when turned on, provides a steep rate of rise of luminous intensity. In a preferred form of the invention, I use a Xenon flash lamp for the light source. When a high voltage is applied to the trigger 62 of the normally off Xenon flash lamp 60, it emits a pulse of light with an exceptionally steep rate of rise of luminous intensity.

This light energy can be transmitted to the light-activated controlled rectifiers in any suitable manner, but in the illustrated form of the invention, light pipes 64, preferably of the fibre optics type, are relied upon. Since the speed of light is so extremely high differences in the distances between the lamp 60 and the light-activated controlled rectifier are not important. Accordingly, light signals of sufficient intensity to fire the light-activated controlled rectifiers reach their respective light sensitive areas at the same instant.

In view of this simultaneous reception of effective light signals, all of the light-activated controlled rectifiers 40 fire at substantially the same instant, thereby applying the above-described steep rise-time current pulse to the gates 20 of the main controlled rectifiers 14 at substantially the same instant. This results in all the main controlled rectifiers being fired at substantially the same time, as is desired.

The turn-on time of light-activated silicon controlled rectifiers can vary slightly depending upon the effective irradiance of the light signal applied to the controlled rectifier, but I limit such variations in time to insignificant values by using a light pulse with a very steep rise-time, as was described hereinabove. For further reducing these very slight variations, I prefer to use light pipes having approximately the same length so that the effective irradiance of each light signal is approximately the same.

An important advantage of the triggering means shown in FIG. 1, is that the triggering source (62, 60) is completely electrically isolated from the gating circuits 20. This complete electrical isolation permits very appreciable simplifications and cost reductions to be made in the electrical insulation that is provided between the triggering source and the high voltage gate circuits 20. The triggering source, or lamp 60, is preferably at ground potential. I am able with the electro-optical triggering means of FIG. 1 to transmit a steep-rise signal to all the gate circuits without interference from leakage inductance or distributed capacity effects such as are encountered in triggering circuits that use pulse transformers for such transmission.

Although I have illustrated the light energy being transmitted to the light-activated controlled rectifiers through light pipes, preferably of the fibre optics type, it is to be understood that other conventional light transmitting means, such as lenses and reflectors, can be used. I can even mount the light-activated controlled rectifiers in a circular or spiral pattern about the light source as a center and dispense with any special light-transmitting means. The central location of the light source will facilitate the delivery of light signals of approximately equal effective irradiance to the light-activated controlled rectifiers.

The term "light" as it appears hereinabove is used in a general categorical manner to denote radiant energy and is intended to comprehend invisible as well as visible radiation. For example, I intend to include ultra-violet and infra-red radiation within the term light, as it appears hereinabove.

FIG. 2 illustrates a slightly modified form of the invention differing from FIG. 1 primarily in having capacitors 70 that are respectively connected in parallel with the resistors 52 of the voltage divider 50, 52. These capacitors 70 are in a substantially fully charged condition prior to firing of the light-activated controlled rectifiers 40. When the light-activated controlled rectifiers 40 are fired by light energy as described hereinabove, the capacitor 70 quickly discharges through a circuit that extends through the cathode 42 and anode 44 of the light-activated rectifier and the gate 20 and cathode 18 of the main controlled rectifier. This discharge produces a short high current trigger pulse that fires the main silicon controlled rectifier 14.

In certain applications, it may be desirable to provide a resistor, such as indicated in dotted line form at 74 in series with the gate 20 to prolong this firing pulse. The firing pulse can be further prolonged by increasing the size of capacitor 70. The resistor 52 across the capacitor 70 has a sufficiently low resistance to limit the voltage across the capacitor to a low enough value to prevent the gate-cathode junction of the main controlled rectifier from being damaged by forward voltage applied thereto when the light-activated controlled rectifier 40 fires.

In one specific embodiment of the invention, the following values have been used for the circuit components of FIG. 2: 100,000 ohms for each resistor 50; 4,700 ohms for each resistor 52; 5,000 ohms for each resistor 24; 56,000 ohms for each resistor 48; .01 microfarad for each capacitor 70; and 0.1 microfarad for each capacitor 26. Each of the main silicon-controlled rectifiers 14 was a General Electric type C35N and each of the light-activated silicon controlled rectifiers 40 was a General Electric type L8F. The voltage applied across terminals 10 and 12 was 2,000 volts DC and a resistive load of 4,000 ohms was connected in series with the main controlled rectifiers 14 as shown by the dotted lines 80. The above values and types are provided by way of example and not limitation.

This circuit of FIG. 2 can be advantageously used in may applications, one of which, for example, is the inverter illustrated in FIG. 3. This inverter comprises two alternately conducting branches, one designated A and the other designated B. A suitable commutating capacitor 90 is connected between the anodes of the top main controlled rectifiers 14 in the two branches. Firing of the controlled rectifiers 14 of branch A is controlled by a lamp 60, and firing of the controlled rectifiers of branch B are controlled by the lamp 60b. When the lamp 60 is turned on to produce a light pulse, the controlled rectifiers 14 of branch A are fired, and current flows through load 80. The capacitor 90 is charged through load 80b during a portion of this interval. When the other lamp 60b is turned on to produce a light pulse, the main controlled rectifiers of branch B fire and the capacitor 90 discharges therethrough, momentarily reverse-biasing the main controlled rectifiers of branch A and thus turning them off. Current flows through the load 80b when the controlled rectifiers of branch B are fired and the left hand plate of capacitor 90 charges positively with respect to its right hand plate through load 80 during part of this period. Current continues flowing through the load 80b until the lamp 60 emits another light pulse. This allows the commutating capacitor 90 to discharge through the controlled rectifiers of branch A and turn off the controlled rectifiers of branch B. This action continues repetitively, so long as the lamps 60 and 60b are alternately pulsed. Any suitable conventional means may be used for alternately pulsing lamps 60 and 60b.

By way of further example, the circuit elements used in FIG. 3 can have the same values as the correspondingly designated circuit elements described in connection with FIG. 2. A suitable value for the commutating capacitor 90 is 0.02 microfarad. The RC time constant of the circuit that comprises resistor 50 and capacitor 70 is low enough to permit the capacitor 70 to be substantially fully recharged before firing of its associated light-activated rectifier 40 when the firing frequency is in the range of 60 to 400 cycles per second.

Although my triggering means is especially advantageous in simultaneously firing series-connected controlled rectifiers, it can also be used to advantage in simultaneously firing of parallel-connected controlled rectifiers. Simultaneous firing of parallel-connected controlled rectifiers is desirable because if one of the parallel-connected rectifiers fires first, it is forced to carry all the current until the other rectifiers are fired, and this could cause its failure. Simultaneous firing, on the other hand, insures a sharing of the total current from the instant of firing.

FIG. 4 illustrates an application of my invention to a circuit containing controlled rectifiers 14 connected in parallel between a pair of terminals 10 and 12. In series with the gate 20 of each controlled rectifier 14 is a light-activated controlled rectifier 40 corresponding to the similarly-designated light-activated controlled rectifier of FIGS. 1 and 2. A voltage divider 50, 52 is connected across each main controlled rectifier 14, and the anode of the light-activated controlled rectifier 40 is connected to an intermediate voltage point on the voltage divider in the same manner as in FIG. 2. Across the portion 52 of the voltage divider, a capacitor 70 corresponding to the similarly-designated capacitor of FIG. 2 is provided.

The light-activated controlled rectifiers 40 are controlled from a single normally-off light source 60, common to both of them. Light from source 60 is supplied to the light-activated rectifiers 40 by light transmitting means 64. When the lamp 60 is fired, it emits a steep-rise pulse of light that reaches the two light activated controlled rectifiers 40 at the same instant in the form of light signals of sufficient irradiance to fire them. They fire substantially simultaneously, allowing the capacitors 70 to discharge through the gate-cathode circuits of the main controlled rectifiers 14, thereby firing the main controlled rectifiers substantially simultaneously, as desired. A resistor 74 connected in series with the gate of each main controlled rectifier is provided to prolong the firing pulse for the main controlled rectifier.

Although the preferred forms of my invention use light-activated controlled rectifiers for triggering the main controlled rectifiers 14, my invention in its broader aspects is intended to comprehend the use of other types of light-activated control elements for controlling the firing of the main controlled rectifiers. In all of these arrangements, it is contemplated that a light source common to the various light-activated control elements will be used for developing light energy that simultaneously reaches the light-activated control elements in the form of light signals of sufficient irradiance to cause triggering of the main controlled rectifiers 14.

While I have shown and described particularly embodiments of my invention, it will be obvious to those skilled in the art that various changes and modifications may be made without departing from the invention in its broader aspects; and I, therefore, intend in the appended claims to cover all such changes and modifications as fall within the true spirit and scope of my invention.

What I claim as new and desire to secure by Letters Patent of the United States is:

1. In combination,
   (a) a pair of terminals adapted to be connected to a source of voltage,
   (b) a plurality of main controlled rectifiers connected in series relationship across said terminals and each having an anode, a cathode, and a gate,
   (c) triggering means for substantially simultaneously applying gating current signal pulses to the respective gates of said main controlled rectifiers to initiate conduction between the anode and cathode of each main controlled rectifier,
   (d) said triggering means comprising a plurality of light-activated controlled rectifiers respectively associated with said main controlled rectifiers,
   (e) each of said light-activated controlled rectifiers having an anode and a cathode connected in series with the gate of its associated main controlled rectifier and means for initiating conduction between its anode and cathode in response to the reception of a predetermined light signal,
   (f) and means including a light source common to all of said light-activated controlled rectifiers for developing and transmitting light energy that simultaneously reaches all of said light-activated controlled rectifiers in the form of light signals of sufficient irradiance to initiate conduction between the anode and cathode of each light-activated controlled rectifier.

2. The apparatus of claim 1 in combination with:
   (a) a plurality of voltage dividers respectively connected across anode and cathode of said main controlled rectifiers,
   (b) and means for respectively connecting the anodes of said light activated controlled rectifiers to intermediate voltage points on said voltage dividers, whereby less voltage is imposed on a light-activated controlled rectifier than on the associated main controlled rectifier while both rectifiers are in nonconducting states.

3. The apparatus of claim 1 in which said triggering means further comprises:
   (a) means including a plurality of capacitors paralleling said main controlled rectifiers for supplying gating current signal pulses to the respective gates of said main controlled rectifiers when said light-activated controlled rectifiers are activated,
   (b) each of said capacitors being connected across the gate-cathode junction of a different one of said main controlled rectifiers and being arranged to discharge through the anode-cathode circuit of the associated light-activated controlled rectifier in response to activation of the latter rectifier.

4. In combination,
   (a) a pair of terminals adapted to be connected to a source of voltage,
   (b) a plurality of controlled rectifiers connected in series relationship across said terminals and each having an anode, a cathode, and a gate,
   (c) triggering means for substantially simultaneously applying gating current signal pulses to the respective gates of said controlled rectifiers to initiate conduction between the anode and cathode of each controlled rectifier,
   (d) said triggering means comprising a plurality of light-activated control elements respectively connected in circuit with a plurality of means serially connected between said terminals for deriving gating current signal pulses from said source of voltage,
   (e) said light-activated control elements being respectively operable in response to the reception of predetermined light signals to cause said triggering means to apply gating current signal pulses to the gates of said controlled rectifiers,
   (f) and means including a light source common to all of said light-activated control elements for developing and transmitting light energy that simultaneously reaches all of said light-activated control elements in the form of light signals of sufficient irradiance to render said light-activated control elements operable.

5. The combination as set forth in claim 4 in which said plurality of means for deriving gating current signal pulses includes a serial string of voltage dividers respectively connected across predetermined controlled rectifiers, and in which each of said light-activated control elements is connected to a comparatively low voltage portion of a different one of said voltage dividers.

6. The combination set forth in claim 4 in which said light source is remote from said light-activated control elements and light energy is transmitted to said elements via a plurality of light pipes.

7. In combination,
   (a) a pair of terminals adapted to be connected to a source of relatively high voltage,
   (b) a plurality of controlled rectifiers connected in series-relationship across said terminals and each having an anode, a cathode, and a gate,
   (c) triggering means comprising light-activated control elements individual to each of said controlled rectifiers for substantially simultaneously applying gating current signal pulses to the respective gates of said controlled rectifiers to initiate conduction between the anode and cathode of each controlled rectifier,
   (d) said triggering means further comprising means, including a light source that is common to all of said light-activated control elements and that is physically and electrically remote therefrom for developing and transmitting light energy that simultaneously reaches all of said light-activated control elements in the form of light signals of sufficient irradiance to initiate conduction between the anode and cathode of each controlled rectifier.

8. The combination set forth in claim 7 in which said light energy is transmitted from said common light source to the respective light-activated control elements via a plurality of parallel light pipes.

9. The combination set forth in claim 7 in which said triggering means includes a plurality of means coupled to the anode and the cathode of the respective controlled rectifiers for producing the gating current signal pulses and for applying said pulses to the gates of said rectifiers in response to activation of the associated control elements.

10. In combination,
    (a) a pair of terminals adapted to be connected to a source of voltage,
    (b) a plurality of main controlled rectifiers connected across said terminals and each having an anode, a cathode, and a gate,
    (c) triggering means for substantially simultaneously applying gating current signal pulses to the respective gates of said main controlled rectifiers to initiate conduction between the anode and cathode of each main controlled rectifier, said triggering means comprising,
        (i) a plurality of means electrically coupled to said terminals for deriving said gating current signal pulses from said voltage source, said pulse deriving means being individually coupled to gates of different rectifiers whereby the respective gates of all of said main controlled rectifiers are supplied with said gating current signal pulses,
        (ii) a plurality of light-activated controlled rectifiers each of which is activated in response to the reception of a predetermined light signal, and
        (iii) means for respectively interconnecting said pulse deriving means and said light-activated controlled rectifiers to enable each pulse deriving means, upon activation of the associated light-activated controlled rectifier, to supply a gating current signal pulse to any gate to which it is coupled,
    (d) and means including a light source common to all of said light-activated controlled rectifiers for developing and transmitting light energy that simultaneously reaches all of said light-activated controlled rectifiers in the form of light signals of sufficient irradiance to activate each light-activated controlled rectifier.

11. The combination of claim 10 in which said main controlled rectifiers are connected in parallel relationship.

References Cited

UNITED STATES PATENTS

| | | | |
|---|---|---|---|
| 2,247,057 | 6/1941 | Hull | 321—27 |
| 3,158,799 | 11/1964 | Kelly et al. | 321—27 |
| 3,235,669 | 2/1966 | Lanham | 307—88.5 |
| 3,267,290 | 8/1966 | Diebold | 307—88.5 |

OTHER REFERENCES

G. E., SCR Manual 3rd Ed., 1964, pp. 91–101, "Electronics," Power and Control Circuits, by Zastrow, Dec. 6, 1963, pp. 56–58.

ARTHUR GAUSS, *Primary Examiner.*

B. P. DAVIS, *Assistant Examiner.*